United States Patent [19]

Bird

[11] Patent Number: 4,484,656
[45] Date of Patent: Nov. 27, 1984

[54] CARRIER VEHICLE FOR SEISMIC VIBRATIONAL SYSTEM

[75] Inventor: James M. Bird, Tulsa, Okla.

[73] Assignee: Industrial Vehicles International, Inc., Tulsa, Okla.

[21] Appl. No.: 392,090

[22] Filed: Jun. 25, 1982

Related U.S. Application Data

[63] Continuation-in-part of Ser. No. 151,256, May 19, 1982, Pat. No. 4,341,282.

[51] Int. Cl.³ .......................... G01V 1/04; G01V 1/09; G01V 1/143
[52] U.S. Cl. ..................................... 181/114; 180/291; 180/75.1
[58] Field of Search ................. 181/114; 180/307, 305, 180/70 MS, 291

[56] References Cited

U.S. PATENT DOCUMENTS 3,789,951  2/1974  Silverman ........................... 181/114
3,811,530  5/1974  Johnston ............................. 181/114
3,905,446  9/1975  Ross .................................... 181/114

OTHER PUBLICATIONS

Norbye, et al., "Buick: The Postwar Years", 1978, pp. 55–57, Motorbooks International, Osceola, Wisconsin.
Dunham, et al., "The Buick, a Complete History", 1980, pp. 267 and 388–389, Princeton Pub. Inc., Princeton, N.J.

Primary Examiner—Joseph Paul Brust

[57] ABSTRACT

An over-the-road type vehicle for transport and powering of a seismic hydraulic vibrator which is adapted to operate in either one of two modes of operation. A first mode is the conventional mode wherein the vehicle is operated over large distances at varying road speeds, obtained by use of multiple gear ratios, and varying engine speeds. The second mode of operation is in a single gear ratio, with engine under control of a governor, to operate at constant high speed, and the movement of the vehicle is by successive short traverses. In the second mode of operation the single engine alternately powers the hydraulic vibrator, then with the engine still at high speed, moves the vehicle to a new vibration point a short distance away. A high energy efficiency is provided by the use of an hydraulic torque convertor, and a high time efficiency is provided by the hydraulic torque convertor, which with engine running at or near maximum speed and the truck at a standstill, can provide a torque magnification to a value which is greater than the engine torque.

8 Claims, 7 Drawing Figures

CARRIER VEHICLE FOR SEISMIC VIBRATIONAL SYSTEM

REFERENCE TO RELATED APPLICATION

This application is a continuation-in-part of my copending application Ser. No. 151,256 now U.S. Pat. No. 4,341,282, filed 5-19-82; of the same title as this application Ser. No. 151,256 is entered by reference into this application.

BACKGROUND OF THE INVENTION

1. Field of the Invention

This invention lies in the field of over-the-road vehicles for transporting and powering an hydraulic seismic vibrator, while operating at high energy efficiency and high time efficiency 2. Description of the Prior Art In the use of seismic vibrators as seismic sources, the vibrator, while operating rests on a baseplate or pad on the earth, with part of the weight of the truck or vehicle pressing down on the baseplate.

In off-the-road vehicles it has become customary to use articulated vehicles with independent hydraulic drive on each of the 4 wheels. The vibrator is positioned in the middle of the vehicle. However, while the hydrostatic type hydraulic drive gave excellent control of the vehicle and fast starts, the energy efficiency of the hydraulic drive system is low, of the order of 75% or less. This would mean that to get 300 horsepower, an engine of 400 HP. would be required, and means would be required to remove 100 HP. of heat from the hydraulic fluid.

While the hydrostatic hydraulic drive of the off-the-road carriers could be used in an over-the-road vehicle, the poor energy efficiency and cost of such a system makes it impractical.

The improved drive system of this invention, using an hydraulic torque converter, provides better energy efficiency than the hydrostatic hydraulic system, and provides equally high time efficiency in fast starts with engine at full speed.

SUMMARY OF THE INVENTION

It is a primary object of this invention to provide a design of an over-the road carrier to transport and power a high frequency hydraulic seismic vibrator, in a system which has high energy efficiency.

It is a further object of this invention to provide a carrier that has very high acceleration, so that the short distance, stop-and-go operation demanded by the seismic process, can be provided with high time efficiency.

These and other objects are realized and the limitations of the prior art are overcome in this invention by constructing the carrier vehicle with the following system components:

1. A more or less conventional construction of cab, frame, front wheels and tandem rear wheels.
2. A single engine large enough to alternately power the vibrator and the vehicle.
3. A gear drive transmission with input connected to the engine, and output connected to the tandem rear wheels.
4. A fast acting hydraulic torque converter that can be engaged with the vehicle at rest, and the engine running at or near maximum operating speed with a single gear ratio.

BRIEF DESCRIPTION OF THE DRAWINGS

These and other objects and advantages of this invention and a better understanding of the principles and details of the invention will be evident from the following description, taken in conjunction with the appended drawings, in which.

DESCRIPTION OF THE PREFERRED EMBODIMENT

Figure 1:
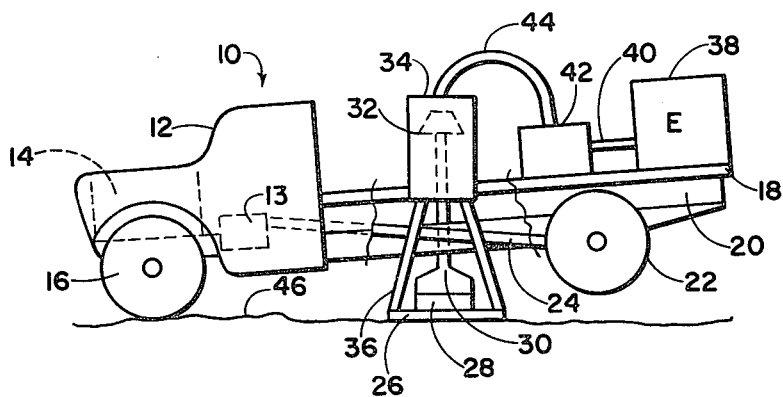
FIG. 1 is a schematic drawing of the prior art construction of an over-the-road seismic vibrator carrier.

Before describing the apparatus illustrated in the drawings, it is desirable to discuss further some of the requirement set on the nature of, and the operation of the carrier system by the type of services provided by the equipment.

The work cycle of a seismic vibrator crew involves a group of three-to-five or more vibrators mounted on a carrier similar to the one of this invention. The assumption will be made, for convenience, that three carriers are used. The three vibrator carriers, or trucks, or vehicles, are spaced a selected distance, one behind the other, about 20–30 feet or so apart. They stop at selected points on a line of vibration points, or VP's, lower the vibrator and baseplate, or pad, to the ground, and lift a portion of the weight of the truck to press the pad to the earth.

The vibrator then runs through a sweep, or a time-pattern of frequencies, which may last from 7 seconds to 28 seconds. All 3 or more vibrators operate precisely in unison during this vibrating cycle, with minimum phase difference. At the end of the vibrating cycle the truck is lowered to the ground and the vibrator and pad are raised. The trucks then move, as rapidly as possible, to the next VP, which may be 20 to 30 feet or so away. All vibrators should move in unison, the same distance, to keep the same relative position pattern, for various reasons, important to the quality of of the seismic data recorded.

In this work program, the vibrators are only "working" while they are vibrating, that is, while the truck is stopped. Obviously the part of this program, (about 6 seconds), while the vibrator is being lifted or lowered, and the carriers are moving to a new VP, is "dead time" and is non-productive, in the seismic sense.

Whether the vibratory cycle lasts for 7 seconds or 28 seconds, it is economically important to move from vibration point to vibration point rapidly. Each second involved in this maneuver means dollars and cents. To illustrate this, it is customary for the vibrator to vibrate between 900 and 1200 "move-ups" a day would result in a loss of approximately 20 minutes productive work.

Because a geophysical crew can cost as much as $2,000 an hour to operate, twenty minutes represents a substantial amount of money to the geophysical contractor.

The pump that operates the vibrator unit is a variable displacement pump of the pressure compensated type. When the sweep signal of the vibrator control unit appears at the servo valve of the vibrator, it is imperative that the maximum operating pressure of the system be present at that moment. The servo valve can present a very steep-fronted demand curve to the hydraulic supply of the vibrator unit. To accommodate this almost square-wave type of demand curve, it is important that the engine by operating at its normal (high) operating speed when the unit is ready to vibrate. This requirement that the engine be operating at a constant high speed complicates the problem of using that engine for moving the vehicle from point-to-point.

Conventional gear boxes and automatic transmissions normally require that the engine be idled before engagement of the transmission. Slowing a 200–400 horsepower engine from its normal operating speed of approximately 1800 rpm to the 600 rpm idling speed, takes too much time. The 600 rpm is necessary before engaging the conventional transmission. Further time also is needed to speed up the engine again after the vehicle has been brought to a stop in preparation for vibrating. The necessary specifications then for a drive system for a vibrator, where one engine is to be used for both the vibrating mode *and* and the vehicle traction mode, is that the vehicle must operate in traction while the engine is running in its governed optimum speed of 1800 to 2000 rpm. While I speak of "normal", or "high", or "maximum", or "at or near maximum" as the operating speed of the engine, this will be the governed, most efficient, operating speed of 1800–2000 rpm.

There is an obvious financial advantage in using only one engine, versus two, which have previously been used with seismic over-the-road carriers. But, as will be explained in connection with FIG. 7, because of the conventional drive shaft, this plan cannot be used with present-day high frequency vibrators.

As previously mentioned, off-the-road vehicles have been built with a single engine driving two hydraulic pumps. One pump is dedicated to the vibrator unit, and the second pump is dedicated to the traction circuit of the vehicle. The traction circuit consists of a hydrostatic hydraulic system, having a variable displacement pump driving a variable displacement type hydraulic motor, which in turn drives the vehicle through a gear transmission. The transmission is mounted to the rear of the vehicle and its output shaft drives forward to the rear of the tandem axle. This arrangement, though not conventional, was utilized for this particular truck design because of the fact that this truck mounted a new high frequency vibrator. This arrangement accomplishes the goal of allowing the single engine to be operated at one constant high speed and to sequentially power both the vehicle and the vibrator.

The hydrostatic hydraulic drive solves the constant-engine-speed problem. There are, however, some disadvantages to this system. The first disadvantage is that the hydraulic pump and the hydraulic motor capable of moving a vehicle of 35,000 pounds are expensive units. Their combined cost is approximately the cost of an additional engine. A hydrostatic drive of this type has one other severe drawback. The over-all efficiency of the hydraulic pump is nominally of the order of 85 percent. The over-all efficiency of the hydraulic motor is approximately the same. When these two efficiencies are multipled together, one ends up with a transmission system that has an over-all efficiency of approximately 72 percent. This efficiency is quite low when compared to conventional mechanical transmissions. If one were to consider an engine of the 400 horsepower category to drive the vehicle, a loss over-all of 25 percent results in 100 horsepower being converted to heat. Furthermore, it is necessary to design into the system means for rejecting approximately 100 horsepower of heat, this further detracts from this system.

Although the hydrostatic hydraulic drive system is high in cost and low in efficiency, it does have the important advantage of being able to operate and drive the vehicle from rest with the engine at normal high operating speed. It was in an attempt to retain this advantage of the hydraulic system for fast acceleration, and keep the other advantages of the mechanical drive system, that this invention was made. What was needed was a clutch that would have the capability of handling the required torque of the vehicle, while having the heat rejection capability of doing this a thousand times a day. Conventional clutches of the normal design would not endure engagement while the engine was going at full speed, and repeating this at the frequency necessary to accommodate the seismic work.

Referring now to the drawings, and in particular to FIG. 1, there is shown a prior art, conventional low-frequency seismic vibrator mounted on an over-the-road vehicle, indicated generally by the numeral 10. It comprises a conventional truck with single or tandem rear wheels 22, cab 12, bed 18, and frame 20. There is a conventional engine 14 (shown in dashed outline) in the front of the truck, conventional transmission 13, and drive shaft 24 to the rear wheels.

The vibrator is indicated by numeral 34 and drives a baseplate, or pad, 26, which rests on the earth 46, through the medium of a tower structure of conventional design, shown schematically by 36. Since the vibrator weighs more than 5000 pounds, the optimum position of the vibrator 34 would, of course, be on top of the pad 26. However, because of the central drive shaft 24, the tower is required to support the vibrator 34, several feet above the pad.

As is well described in the literature, and in the patent art, the vibrator is operated with the pad on the earth and the truck raised (to the position shown) by means of a hydraulic lifting mechanism 32 and 30, pressing down on the pad through a compliance 28.

The vibrator is driven by means of a hydraulic pump 42 from a second engine 38 through shaft 40, all mounted on the rear deck 18. The hydraulic fluid is applied through hose 44 to the control valves of the vibrator in a conventional manner.

Figure 2:
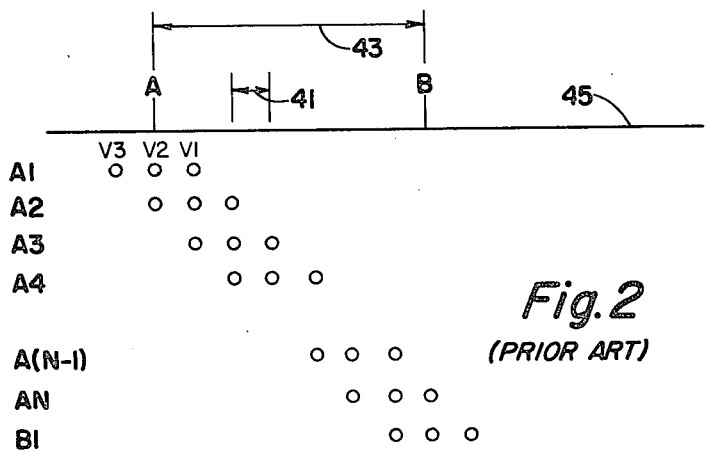
FIG. 2 is an illustration of the prior art normal procedure in carrying out seismic operations with multiple vibrators.

Referring briefly to FIG. 2 there is shown schematically a plan of operation of a seismic vibrator crew in the prior art. There is a line of profile 45, along which the geophones (not shown) are laid out, and along which the vibrators are run. Numeral 41 indicates the spacing between successive vibrators along the line. There may be 3 to 5 or more vibrators, numbered for convenience V1, V2, V3, etc. Numeral 43 indicates the spacing AB between successive geophone groups along the spread, or line of profile. The dimension 41 may be of the order of 20–25 feet, and 43 of the order of 200–250 feet, or more.

The successive positions A1, A2 . . . A(n−1), AN, B1, etc. represent successive vibrating positions or VPs, for the vibrators along the profile line 45. The various positions A1, A2, A3, etc. are shown laterally displaced for clarity. Actually the vibrators are in line 45, and V2, V3 successively take the prior positions of V1, and so on. The position B1 starts the vibrations in relation to the next geophone group B-C and so on. Since the length of the carrier vehicles may be of the order of 20 feet, it can be seen that they move in precise synchronism in order not to interface with each other, and to maintain the same relative positions.

This description of the operation of the vibrator forms no part of the invention, is conventional, and is provided simply to illustrate the service to which the carrier vehicles are put.

Figure 3:
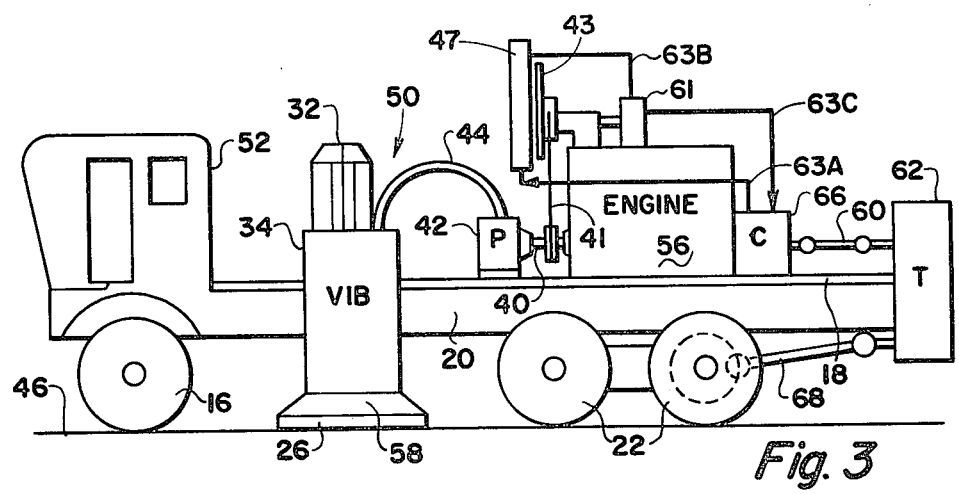
FIG. 3 is a schematic illustration of the carrier vehicle of this invention.

Referring now to FIG. 3, there is shown schematically one embodiment of the vibrator carrier of this invention. Like FIG. 1 it has the basic vehicle of frame 20, deck 18, front wheels 16, rear (dual) wheels 22, vibrator 34, baseplate or pad 26, mounting or mechanical coupling 58, for rigidly fastening the vibrator 34 to the pad 26. etc. Unlike FIG. 1, FIG. 3 has only a single engine 56, on the rear deck. This engine is larger than 38 of FIG. 1 since it supplies power to both the vibrator system and the vehicle. And, of course, with the single engine in this position there is no conventional long drive shaft, such as 24, and the vibrator 34 can be placed in the middle of the vehicle, and low on the pad 26, with a simple rigid mechanical coupling 58. Of course, the hydraulic lift mechanism 32 (which is conventional) is provided to raise the vibrator and pad while moving; and then while vibrating, for raising the vehicle partially off the ground, to apply weight to hold the pad in contact with the earth.

The engine 56 supplies power through shaft 40 to the hydraulic pump 42 which supplies pressurized liquid to the vibrator 34 through hose 44 in a conventional manner. Shaft 40 also drives a fan 43 through belts 41 to cool radiator 47. The main drive control or hydraulic torque converter 66 is direct-driven by the engine, and applies power to drive shaft 60. The oil which cools and lubricates the hydraulic torque converter is circulated by small pump 61, from the hydraulic torque converter 66 over line 63A, to the radiator 47, over line 63B to the pump 61, and over line 63C back to the hydraulic torque converter.

The engine 56 and connecter 66 supply power through drive shaft 60 to the gear transmission (commercial) 62. The gear transmission provides various drive speeds for conventional over-the-road operations. The output driveshaft 68 of the transmission 62 drives the rear wheels 22.

The vehicle shown in FIG. 3, which has just been described, is a novel type of vehicle for over-the-road service as a carrier for a seismic vibratory source.

It has a single engine which powers a hydraulic pump to serve the vibrator, and it has a mechanical transmission in combination with a novel hydraulic converter to power the vehicle.

This vehicle is adapted to be operated in either of two operating modes. The first mode is the customary long-distance travel mode in which various gear ratios of transmission are used and the engine is operated at varying speeds, from idling to maximum speed responsive to the accelerator. Shifting of gears is done while the engine is at low speed.

The second mode of operation is that of the normal vibrational seismic cycle, in which the vibrator is operated for a selected short period of time with engine at top speed, and full hydraulic power is available to the vibrator. After the vibrational part of the cycle is completed and the vibrator plus pad is lifted, preparatory to moving a selected short distance, and while the engine is still at top speed, the torque converter 66 is set to maximum torque and the vehicle accelerates at the maximum rate, dependent on the torque output of the converter. The vehicle then travels a selected distance, less than the desired move of 20-30 feet, the converter is changed to low torque and the brakes are applied to stop the vehicle at the desired point.

This service is different from any other over-the-road operation, and differs mainly in the second mode. The engine is continuously under control of a governor to operate at maximum speed. The duty cycle that the converter is called on to perform is extremely demanding, and no conventional clutch is available on the market that will do this.

Because of the hydraulic converter and drive used, the energy efficiency is much higher than that of the hydraulic drive. Also, since the engine is constantly running at maximum speed, and maximum torque and power is available for acceleration and traverse of the vehicle, the vehicle operates at maximum time efficiency. That is, it carries out the successive short moves demanded by the seismic program, in much less time than is possible with conventional vehicles, which must operate only in the first mode.

While I have described my invention in terms of a vehicle, as shown in FIG. 3, that has a single engine mounted on the rear deck. Part of the reason for this was the need to mount the conventional high frequency vibrator directly on top of the pad, on the ground. This could not be done with the conventional truck, because with the engine in front, there is a long driveshaft between the engine and the rear wheels which prevents the placement of the conventional vibrator in the center of the truck.

The present-day standard vibrator comprises a central double-acting piston and cylinder, housed in a heavy, thick-walled steel mass. This steel mass, which may weigh of the order of 5,000 pounds, or more, is a reaction mass, and in operation, remains substantially at rest, permitting the vibrator to push and pull against it, to oscillate the baseplate.

Other designs of vibrators are possible, such as that shown in U.S. Pat. No. 3,789,951, issued to Daniel Silverman, Feb. 5, 1974, and others, which use two or more smaller cylinders and pistons, that can be positioned on opposite sides of the drive shaft. The reaction mass can be in the form of an inverted U resting on the one or two cylinders on each side of the driveshaft. This design would not suffer the same difficulties as the system which places the vibrator on top of a tower resting on the baseplate.

Figure 7:
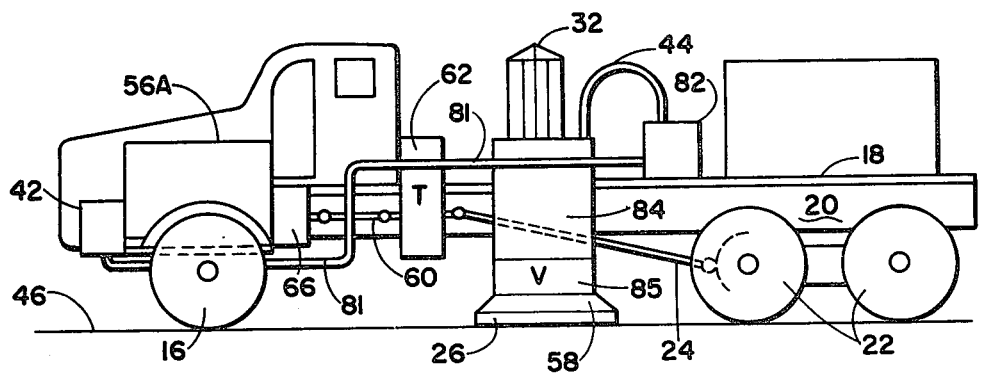
FIG. 7 is a schematic drawing of a second embodiment of this invention.

In the event such a multiple vibrator system becomes available, then the design of carrier shown in FIG. 7 becomes practical.

In this embodiment the single engine 56A is mounted under the hood of the vehicle. It drives a hydraulic compressor 42 that pumps pressurized hydraulic fluid by pipe or hose 81 to an accumulator 82, which provides fluid to the vibrator 85 through hose 44 in a conventional manner. The torque converter 66, as shown in FIG. 7, is attached to the output of the engine. This drives a conventional gear transmission 62 through driveshaft 60. The output of the transmission drives the rear wheels through driveshaft 24 in a conventional manner. All other features are conventional or are similar to FIG. 3. The reaction mass is shown as 84, and is in the form of the inverted U shape. This configuration with the multiple pistons and cylinders positioned on both sides of the driveshaft, provides an elongated vertical opening through which the driveshaft 24 operates.

Figure 4:
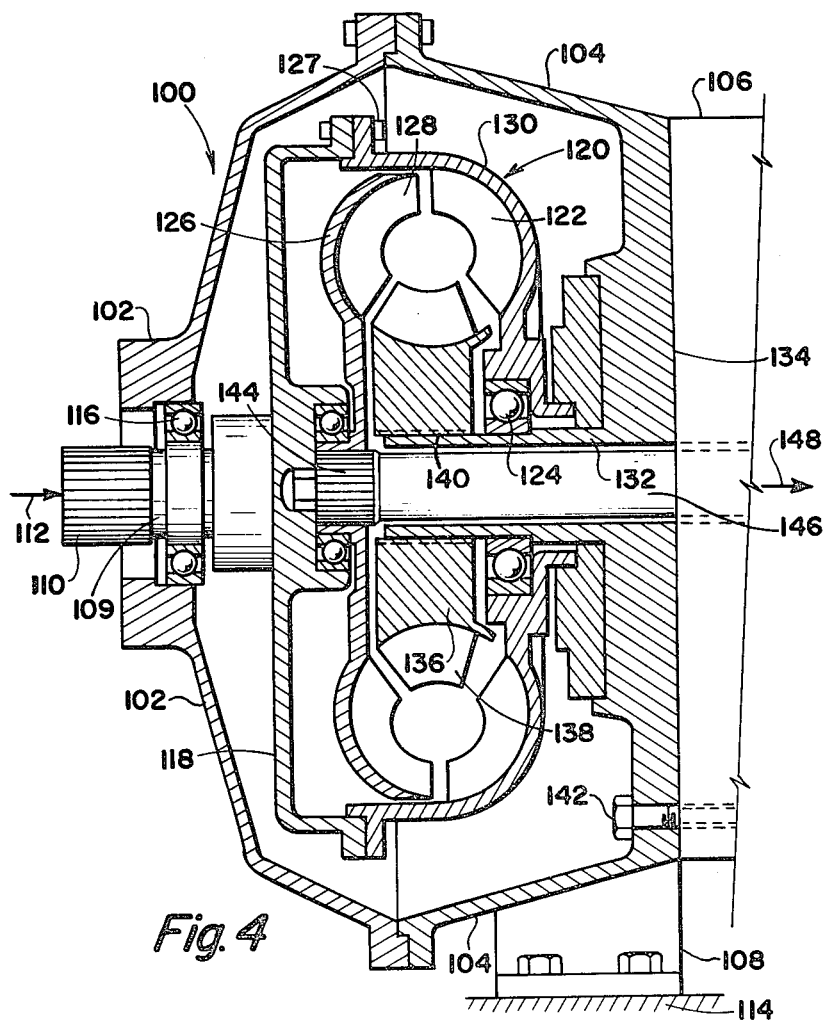
FIG 4 is a schematic diagram of the principle of the hydraulic torque converter.

Referring now to FIG. 4 there is shown one embodiment of a hydraulic torque converter such as would be used in the apparatus of this invention. It is quite schematic and leaves out minor detail which is well known in the art, and need not be described in great detail The construction of the hydraulic torque converter, per se, forms no part of this invention since it is a commercial product that can be purchased over the counter. What is new and novel in this invention, is the method of utilizing and controlling this hydraulic torque converter to provide an improved construction and operation of this carrier vehicle.

Figure 6:
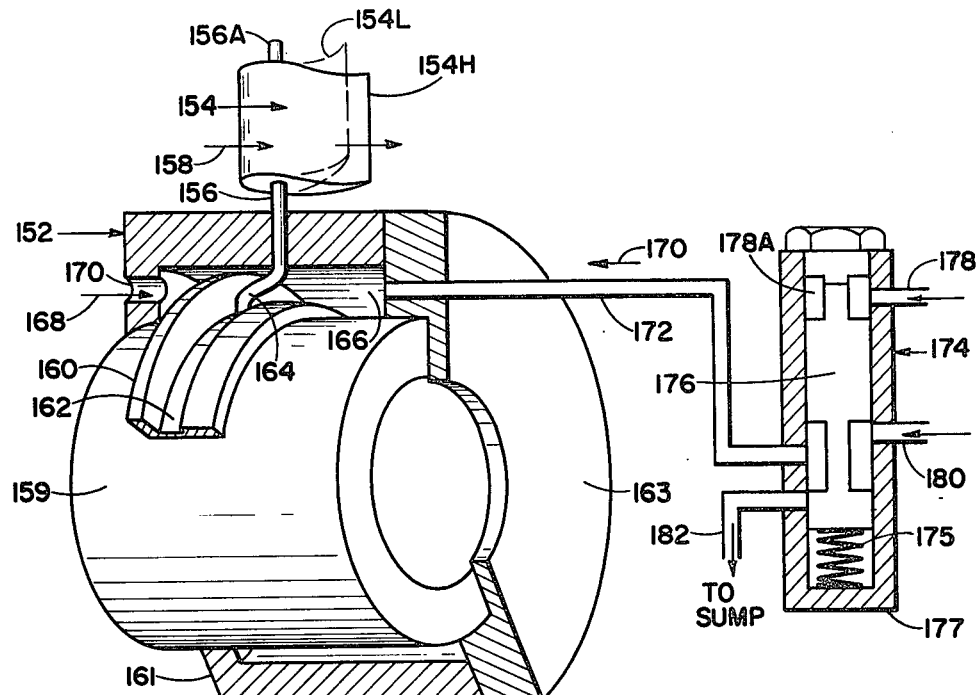
FIG. 6 is a schematic diagram illustrating the principle of the adjustable vane stator of the hydraulic torque converter.

The control apparatus 152 of FIG. 6, exclusive of the hydraulic controls 177, are, in practice, inside the housing 100 of FIG. 4. Since this could not be illustrated very well in FIG. 4, it was moved out of that figure for the purpose of explaining its operation.

The hydraulic torque converter 100, is similar, in some respects, to the hydraulic drives which are provided for passenger automobiles. However, this is more than a simple hydraulic drive which provides slip between the driving part and the driven part. In this hydraulic torque converter there are two facing annular dishes 120, 126, with spaced radial vanes 122, 128 rotating on separate axial shafts 109 and 146. One of the dishes 120 is called a pump, which is the driver, the other one 126 is called a turbine, and is the driven unit. There is also a third unit which is called the stator, stationary vaned, which is a ring element 136, 138, which fits into the space between the vanes 122 in the pump and 128 in the turbine. The stator serves to control the return flow of oil from the turbine 126 back to the pump 120, in such a way as to vary the torque transfer from the pump to the turbine.

This stator 136 is mounted on a tubular element 132, which is attached to the case 134, 104, 102 of the converter, which is mounted 108 to the truck frame 114. The pump and the turbine both rotate in the same direction.

The central circular stator remains stationary. However, it differs from the stator elements of a steam turbine, for example, in which the angles of the vanes are predetermined and are fixed. In this torque converter, the vanes are movable about radial axes, so that the flow of oil from the rotating turbine can be redirected to the pump by way of different angles. Depending upon the particular angle of flow of the return oil to the pump, the torque generated in the turbine can be varied greatly. In fact, the torque supplied by the driven shaft 110 to the pump can be magnified by a sizable factor when it is delivered as torque to the turbine shaft, dependent upon the angle of the vanes of the stator. This will be explained in terms of FIGS. 4, 5 and 6.

In FIG. 4 the numeral 100 generally indicates the hydraulic torque converter which has a case made in two parts 102 and 104, 134 which enclose the operating mechanism. The converter has an input power shaft at one end, in accordance with the arrow 112 to a spline 110 on the input shaft 109. There is an output shaft 146 which is driven by the turbine 126 which carries power back to the gear transmission 106 which, however, forms no part of this invention.

FIG. 4 is a vertical crossection in a diametral plane, and shows the three parts of the hydraulic torque converter. The pump indicated generally by the numeral 120, the turbine indicated by the numeral 126, and the stator indicated by numeral 136. The arcuate elements 122, 128 and 138 are vanes which are built into the shallow annular troughs 122, 128. They are in radial planes spaced equally around the central axis. The converter itself is in the overall shape of a toroid, or a doughnut, which when cut on a diametral plane would show the two circular crossections. However, when sectioned in a transverse plane there would be a circular annular trough or dish with radial vanes spaced uniformly around the axis.

The power entering through the spline 110 is delivered by shaft 109, supported in bearing 116, to a plate structure 118 to which is bolted 127 the housing 120 of the pump element 120. The pump housing is supported in bearing 124, which is itself supported on the tubular portion 132 of the back wall 134 of the outer case. So the short shaft 109 rotates in two spaced bearings 116 and 124 and encloses the space which houses the pump, the turbine and the stator.

The driven element is the turbine 126 which is supported on the shaft 146 by means of a spline 144, so that any power delivered by the moving oil in the converter, from the pump vanes 122 to the turbine vanes 128 will drive the turbine housing 126 and through the shaft 146 provide power as shown by an arrow 148 to the gear transmission which is not shown, but which is well known in the art.

The third element of the converter is the stator 136 with its blades 138. The support structure 136 which is keyed at 140 to the tubular portion 132, is supported by the back plate 134. Thus the stator is attached solidly to the housing 134, 104, 102, and the other two parts rotate, the pump on the input shaft 109, and the turbine on the output shaft 146.

Referring now to FIG. 6 there is shown in schematic form the stator vane 154 which represents one of the stator vanes 138, with its radial support shaft 156, the outer end 156A of which is carried by an outer ring (not shown). The inner end of the shaft 156 is bent into a crank shape, which rides in a slot 162 in the outer surface of a piston 160. The piston 160 slides on the hub 159 with a very small clearance on the outer edge of the housing 161. The housing is cup shaped, with a cover 163 which provides a cylinder space 166 in which the piston 160 operates. There is an inlet opening 170 for the inflow of a low pressure fluid indicated by arrow 168. This low pressure alone pushes the piston to the right and moves the vane to the position of the solid outline 154H which would be in the high torque mode. When the piston is pushed to the left by injecting through the pipe 172 a high pressure fluid into the space 166, the piston is moved to the left and the vane rotates into the position of the dashed outline 154L. The flow of hydraulic fluid from the turbine back to the pump flows across the vanes as shown by arrows 158, remembering that the turbine is on the left side of the vane, and the pump portion is on the right side of the vane.

Means are provided, including a source of high pressure fluid attached to pipe 180 in a valve 174. There is a piston 176 which is movable downward from its indicated position, but is restrained by a spring 175 inside of the cylinder 177. When a high pressure fluid is injected into pipe 178, the piston 176 moves downwardly and the high pressure fluid which would be in the space 166 now leaks off to the sump, by means of pipe 182. When the pressure in the pipe 178 is removed, the spring pushes the piston back to the top and the high pressure fluid flows into 180 and through the line 172 in accordance with arrow 170 to the space 166.

With the high pressure cut off from the space 166, which is then connected to the sump, the low pressure on the left side of the piston pushes it to the right and the vanes then move in a position more or less in an axial plane where the high torque condition becomes available. When the high torque is not desired, the high pressure 180 causes the piston to move to the left and the vanes then tend to close one against the other to reduce the direct return of the oil from the turbine to the pump.

Figure 5:
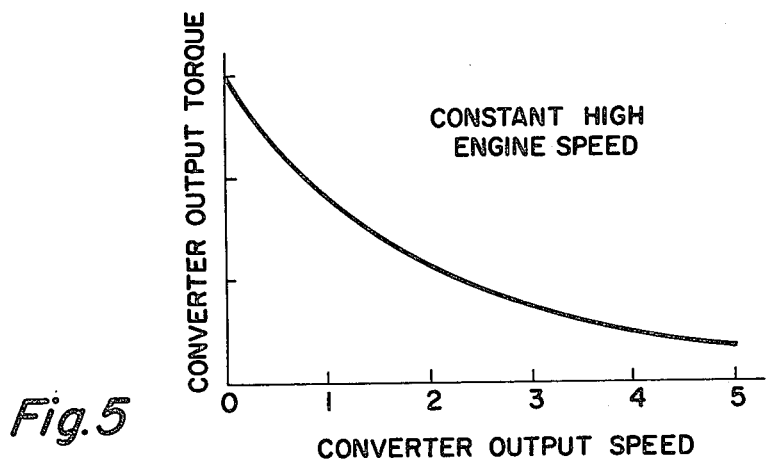
FIG. 5 is a curve illustrating the torque output of the hydraulic torque converter as a function of speed of the output shaft.

The hydraulic torque converter shown in FIGS. 4 and 5 is an ideal element for application to this invention. In operating on the seismic basis, assume that the truck is stationary, and that the vibration period has just ended. The engine is running at full speed and the pad supporting the vibrator has been lifted off the ground. The next operation is to move the truck 20 to 30 feet in the shortest possible time.

Since the vehicle is not moving, the turbine blades are stationary and with high pump speed, the maximum torque condition is available. This is shown in FIG. 5 where the ordinate is output torque of the shaft 146, and the abscissa is turbine speed or shaft speed in arbitrary units. At zero shaft speed, the torque is a maximum so that as soon as the vanes are turned to the position 154H of high torque, the maximum torque output of the device is available to accelerate the vehicle in the shortest possible time. Of course, as the vehicle speeds up, the torque will drop. But the important thing is to get that first very high acceleration, to get the truck moving.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. In a vehicle having only a single engine, for transport and powering of a seismic hydraulic vibrator, for over-the-road use, comprising:
   (a) means to carry a seismic hydraulic vibrator on said vehicle, and to drive a hydraulic pump from said single engine, for pressurizing a selected first fluid for powering said vibrator, and means to control said vibrator;
   (b) gear transmission means between said single engine and the wheels of said vehicle;
   the improvement in means to repeatedly rapidly start said vehicle, for short distance travel, while said engine is running continuously at or near maximum speed, comprising:
   (c) an hydraulic torque converter means connected into the drive system between said single engine and said wheels; said hydraulic torque converter means capable of repeatedly starting said vehicle from rest, with said engine speed constant, at or near maximum engine speed, and constant gear ratio;
   whereby said single engine operating at or near maximum engine speed alternately powers the operation of said vibrator when said vehicle is at rest, and powers operation of traversal of the vehicle over a series of new vibration points spaced at about equal short distances, at constant gear ratio.

2. The vehicle as in claim 1 in which the number of starts of said vehicle with said hydraulic torque converter means while the engine is running at or near maximum speed is at least 500 per day.

3. The vehicle as in claim 1 in which the number of starts of said vehicle with said hydraulic torque converter means while said engine is running at or near maximum speed is at least 750 per day.

4. The vehicle as in claim 1 in which said vibrator is mounted within an opening in the bed of said vehicle intermediate the ends of the frame of said vehicle; and in which
   (a) said single engine is mounted on said bed aft of said opening;
   (b) said hydraulic torque converter means is attached to the output shaft of said engine facing aft;
   (c) the output shaft of said hydraulic torque converter means is connected by first drive means to said gear transmission means, at the back end of said vehicle; and
   (d) the output shaft of said gear transmission means is conncted to the rear wheels of said vehicle by means of a second drive means.

5. The vehicle as in claim 1 in which;
   (a) said single engine is mounted at the front end of said vehicle;
   (b) said hydraulic torque converter means and said gear transmission means are mounted behind said engine;
   (c) the output shaft of said hydraulic torque converter means drives said gear transmission means, the output of which is connected by a long drive shaft to the rear wheels of said vehicle.

6. The vehicle as in claim 1 and including means to control the torque transmitted by said hydraulic torque converter means, at or near maximum engine speed, by means of a high pressure second fluid.

7. The vehicle as in claim 6 in which the pressure applied by said high pressure second fluid is variable with time in a selected manner.

8. The vehicle as in claim 5 in which said seismic hydraulic vibrator comprises at least two separate vibrator units, spaced apart, and attached to the baseplate at least one on each side of said long drive shaft, and said at least two vibrator units supporting at least one reaction mass.

* * * * *